United States Patent
Saukaitis et al.

(10) Patent No.: US 7,744,675 B2
(45) Date of Patent: Jun. 29, 2010

(54) GAS SEPARATION MEMBRANE COMPRISING A SUBSTRATE WITH A LAYER OF COATED INORGANIC OXIDE PARTICLES AND AN OVERLAYER OF A GAS-SELECTIVE MATERIAL, AND ITS MANUFACTURE AND USE

(75) Inventors: John Charles Saukaitis, Katy, TX (US); Alan Anthony Del Paggio, Spring, TX (US)

(73) Assignee: Shell Oil Company, Houston, TX (US)

( * ) Notice: Subject to any disclaimer, the term of this patent is extended or adjusted under 35 U.S.C. 154(b) by 245 days.

(21) Appl. No.: 11/932,159

(22) Filed: Oct. 31, 2007

(65) Prior Publication Data

US 2008/0282882 A1  Nov. 20, 2008

Related U.S. Application Data

(60) Provisional application No. 60/864,876, filed on Nov. 8, 2006.

(51) Int. Cl.
 *B01D 53/22* (2006.01)
 *B01D 67/00* (2006.01)
 *B01D 69/02* (2006.01)
 *B01D 71/02* (2006.01)

(52) U.S. Cl. .......................... 95/55; 95/45; 95/56; 96/8; 96/10; 96/11; 55/523; 55/524; 55/DIG. 5; 423/644; 423/648.1; 427/304; 427/331; 427/383.3; 427/383.5; 427/421.1; 502/4; 502/9; 502/10; 502/439

(58) Field of Classification Search .............. 95/45, 95/55, 56; 96/4, 8, 10, 11; 55/523, 524, 55/DIG. 5; 423/644, 648.1; 427/331, 383.3, 427/383.5, 301, 304, 421.1; 502/4, 9, 10, 502/439

See application file for complete search history.

(56) References Cited

U.S. PATENT DOCUMENTS

| | | | | |
|---|---|---|---|---|
| 5,259,870 A | * | 11/1993 | Edlund | 95/56 |
| 5,393,325 A | | 2/1995 | Edlund | 95/56 |
| 5,686,150 A | * | 11/1997 | Matsumoto | 427/558 |
| 6,235,417 B1 | * | 5/2001 | Wachsman et al. | 95/56 |
| 6,761,755 B2 | * | 7/2004 | Jantsch et al. | 96/11 |
| 7,018,446 B2 | * | 3/2006 | Alvin et al. | 95/56 |

(Continued)

FOREIGN PATENT DOCUMENTS

DE  19734957  3/1999

(Continued)

OTHER PUBLICATIONS

Zhao, Hongbin et al., "Preparation and Characterization of Novel Porous Metal/Ceramic Catalytic Membrane Materials", 1995, Catalysis Today, vol. 25, pp. 237-240.*

(Continued)

*Primary Examiner*—Jason M Greene
(74) *Attorney, Agent, or Firm*—Charles W. Stewart

(57) ABSTRACT

A gas separation membrane and a method of manufacturing such gas separation membrane that comprises a porous substrate treated with a layer of metal-coated inorganic oxide particles and with the layer of such metal-coated inorganic oxide particles being coated with an overlayer of a gas-selective material.

23 Claims, 2 Drawing Sheets

U.S. PATENT DOCUMENTS

Figure 1:
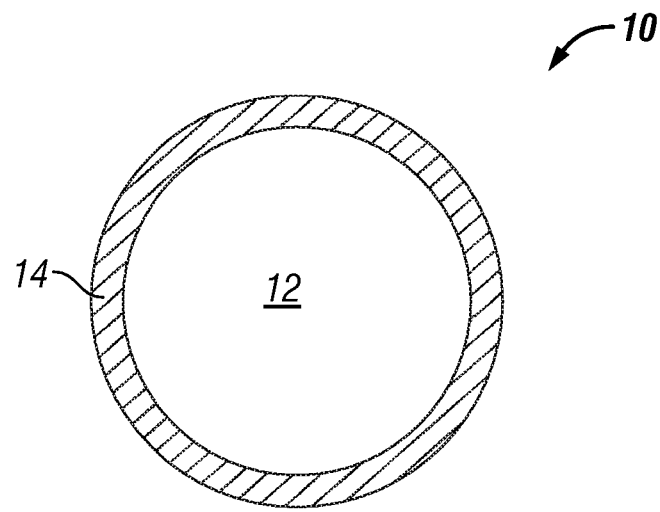

| | | | |
|---|---|---|---|
| 7,045,015 B2 | 5/2006 | Renn et al. | 118/686 |
| 7,524,361 B2 * | 4/2009 | Park et al. | 96/4 |
| 2004/0237779 A1 | 12/2004 | Ma et al. | 95/55 |
| 2004/0237780 A1 | 12/2004 | Ma et al. | 95/55 |
| 2004/0244589 A1 * | 12/2004 | Bossard et al. | 96/11 |
| 2004/0244590 A1 | 12/2004 | Ma et al. | 96/11 |
| 2005/0011359 A1 * | 1/2005 | Pan et al. | 96/10 |
| 2006/0008590 A1 | 1/2006 | King et al. | 427/421.1 |
| 2006/0016332 A1 | 1/2006 | Ma et al. | 95/55 |

FOREIGN PATENT DOCUMENTS

| | | |
|---|---|---|
| WO | WO2004/098751 | 11/2004 |
| WO | WO2008118560 | 10/2008 |

OTHER PUBLICATIONS

Stephen N. Paglieri et al., "A New Preparation Technique for Pd/Alumina Membranes with Enhanced High-Temperature Stability," *Ind. Eng. Chem. Res.* 1999, 38, pp. 1925-1936.

* cited by examiner

GAS SEPARATION MEMBRANE COMPRISING A SUBSTRATE WITH A LAYER OF COATED INORGANIC OXIDE PARTICLES AND AN OVERLAYER OF A GAS-SELECTIVE MATERIAL, AND ITS MANUFACTURE AND USE

This application claims the benefit of U.S. Provisional Application Ser. No. 60/864,876, filed Nov. 8, 2006.

The invention relates to a gas separation membrane that includes a porous substrate over which is a layer of noble metal eggshell catalyst covered with an overlayer of a hydrogen permeable material, the manufacture of the gas separation membrane and the use thereof.

There has been for many years an ongoing effort to develop new and improved composite gas separation membranes for the selective separation of a particular gas from a gas mixture. For instance, hydrogen-permeable composite metal membranes consisting of a thin noble metal coating over a porous support material are known to be useful in the separation of hydrogen from hydrogen-containing gaseous streams. However, these types of hydrogen separation membranes tend to be unstable in their performance when used in high temperature hydrogen separation applications. This lack of stability is thought to be caused by intermetallic diffusion between the noble metal coating layer and the permeable base metal of the membrane when it is used in high temperature applications. The diffusion of iron and other elements from within the permeable base metal into the noble metal coating layer causes reductions in the selective permeability of the noble metal coating layer. To resolve this and other problems associated with hydrogen separation membranes, there has been an effort to develop composite gas separation membranes that have an intermediate layer placed between the noble metal layer and the porous support material to act as a metal diffusion barrier.

An example of a prior art composite gas separation module is that taught by US patent application publication number US 2006/0016332, which discloses a module having an intermediate layer of preactivated powder and binder metal that is distributed uniformly throughout the intermediate layer that is deposited upon a porous substrate, and over which intermediate layer is a dense gas-selective membrane overlayer. The preactivated powder may be a metal, metal oxide, ceramic, or zeolite powder that is surface activated by depositing a metal nuclei, such as a palladium nuclei, onto the surface of the powder by, for example, seeding the powder with a hydrogen-selective metal using an aqueous activation solution. The publication teaches that the surface activation may be done by first sensitizing the powder with an aqueous stannous chloride ($SnCl_2$) sensitization solution followed by its activation with an aqueous palladium chloride ($PdCl_2$) activation solution. The publication does not teach any other method of surface activation.

US 2006/0016332 does not disclose the use of an eggshell catalyst intermediate layer in the manufacture of its gas separation module. Moreover, it has been determined by the inventors hereof that the use of surface activated powders that have been prepared by using an aqueous stannous chloride sensitization solution as is taught by US 2006/0016332 tend to leave undesirable amounts of tin on the surface activated powder. The undesirable effect of tin contamination in palladium film is noted by Paglieri et al. in their article entitled "A New Preparation Technique for Pd/Alumina Membranes with Enhanced High-Temperature Stability," *Ind. Eng. Chem. Res.* 1999, 38, 1925-1936, which states that the presence of the tin may have an adverse impact on the high-temperature gas separation membrane stability. Another disadvantage of the sensitization method is that it utilizes the aqueous stannous chloride solution. This is an aqueous waste that requires additional treatment prior to its disposal.

US 2006/0016332 further suggests the need for the use and application of a binder metal in the intermediate layer of its gas separation module for the purpose of imparting mechanical stability. The elimination of the use of this binder metal can provide for a lower manufacturing cost of the composite gas separation module by eliminating at least one step in the manufacture thereof, and it may also lower the cost of the composite gas separation module by reducing the amount of metal that is required to be used in its manufacture.

It is, thus, an object of the invention to provide a composite gas separation membrane that is useful in the selective separation of hydrogen from a hydrogen-containing gas stream under high temperature conditions.

It is another object of the invention to provide an improved method of manufacturing a composite gas separation membrane.

Yet another object of the invention is to provide a process for selectively separating hydrogen from a hydrogen containing gas stream.

Yet another object of the invention is the novel utilization of an eggshell catalyst in the preparation of a gas separation membrane.

Accordingly, one aspect of the invention is a gas separation membrane, comprising: a porous substrate treated with a layer of noble metal eggshell catalyst with said layer being coated with an overlayer of a gas-selective material.

Another aspect of the invention is a method of making a gas separation membrane, wherein said method comprises: applying to a surface of a porous substrate a layer of a noble metal eggshell catalyst to thereby provide a surface treated porous substrate; and coating said surface-treated porous substrate with an overlayer of a gas-selective material to thereby provide a coated, surface-treated porous substrate suitable for use as said gas separation membrane.

In still another aspect of the invention is a process for separating hydrogen from a hydrogen-containing gas stream, wherein said process comprises: passing said hydrogen-containing gas stream over a gas separation membrane, comprising a porous substrate treated with a layer of a noble metal eggshell catalyst with said layer being coated with an overlayer of a gas-selective material, under temperature and pressure conditions such that hydrogen from said hydrogen-containing gas stream selectively passes through said gas separation membrane.

FIG. 1 depicts certain features of the noble metal eggshell catalyst that is applied to the surface of a porous substrate in the manufacture of the gas separation membrane of the invention.

Figure 2:
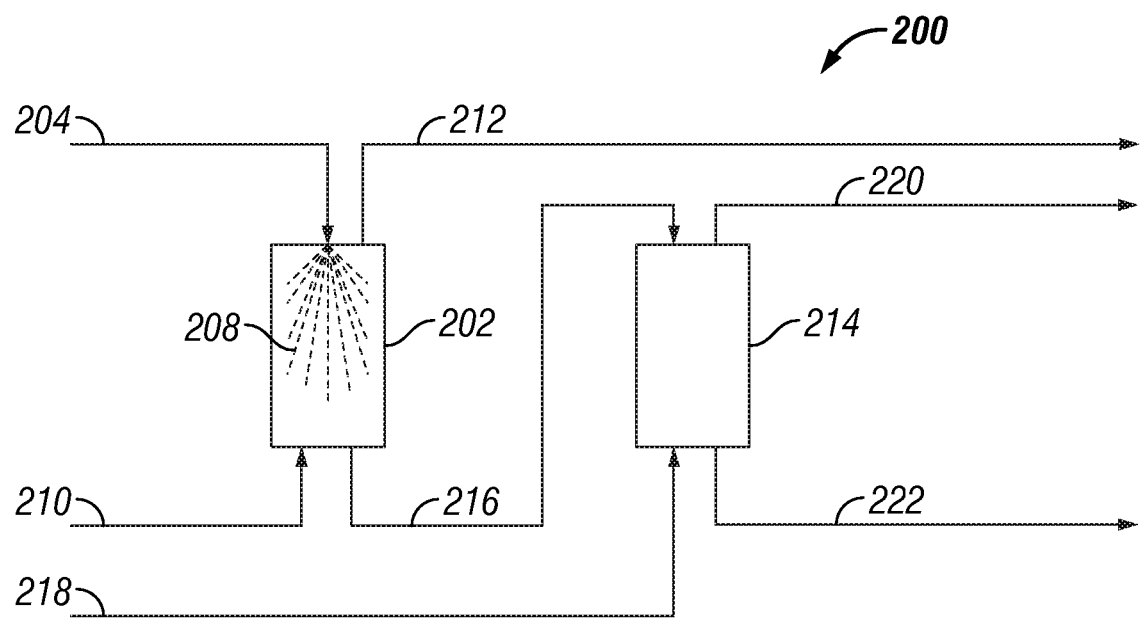

FIG. 2 presents a block diagram showing one suitable method by which the noble metal eggshell catalyst that is depicted in FIG. 1 may be manufactured.

Figure 3:
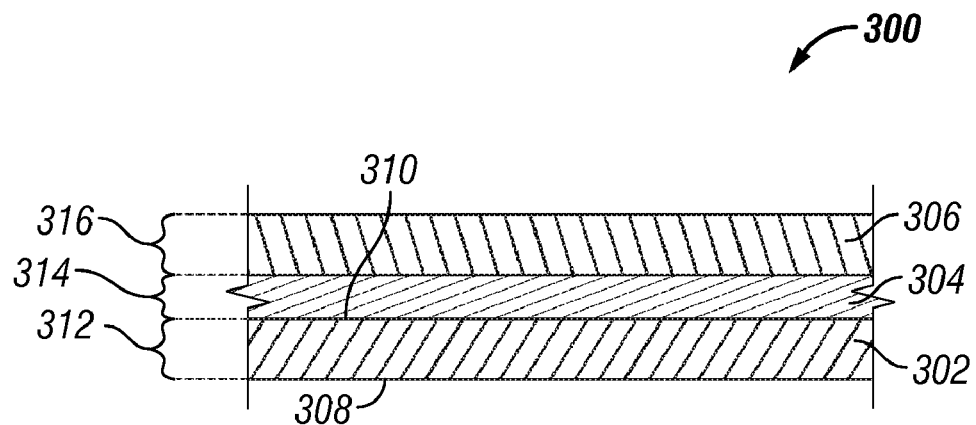

FIG. 3 presents a cross-section of one embodiment of the gas separation membrane of the invention showing the porous substrate having placed thereon a layer of noble metal eggshell catalysts that are similar to the one depicted in FIG. 1 and over which layer is an overlayer of a gas-selective, hydrogen permeable material.

Figure 4:
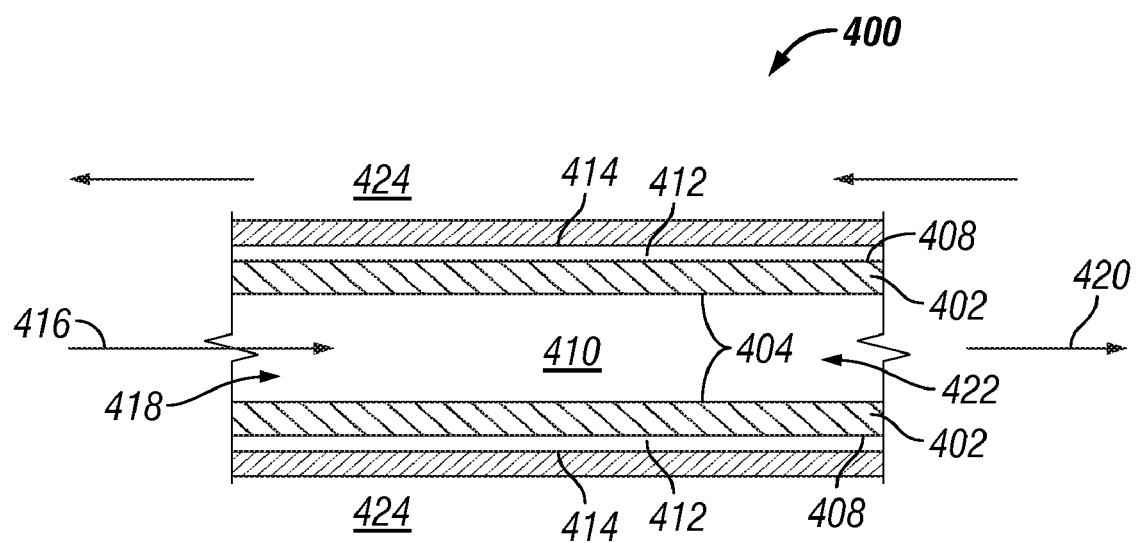

FIG. 4 depicts a cross-section of a gas separation membrane of the invention used in a process for the selective separation of a gas component from a gas mixture.

The inventive gas separation membrane comprises a porous substrate that is treated with a layer of noble metal eggshell catalyst. The layer of noble metal eggshell catalyst is sandwiched as an intermediate layer between the porous substrate and an overlayer of gas-selective material to provide a coated, surface-treated porous substrate that can be used as a gas separation membrane. The use of the layer of noble metal eggshell catalyst as the intermediate layer is a particularly unique feature of the inventive gas separation membrane, and it provides for benefits not observed with prior art composite gas separation membrane systems or modules.

The gas separation membrane of the invention is made by applying to the surface of a porous substrate, made from a porous metal material, a layer of the noble metal eggshell catalyst to thereby provide a surface treated porous substrate. The surface treated porous substrate is then coated with an overlayer of a hydrogen permeable, gas-selective material to thereby provide the coated, surface-treated porous substrate having gas separation properties.

The porous substrate of the invention may include any porous metal material that is suitable for use as a support for the layer of the noble metal eggshell catalyst and overlayer of gas-selective material and which is permeable by hydrogen. The porous substrate may be of any shape or geometry; provided, that, it has a surface that permits the application thereto of the layer of noble metal eggshell catalyst and the deposition of the coating of the gas-selective material. Such shapes can include planar or curvilinear sheets of the porous metal material having an undersurface and a top surface that together define a sheet thickness, or the shapes can be tubular, such as, for example, rectangular, square and circular tubular shapes that have an inside surface and an outside surface that together define a wall thickness and with the inside surface of the tubular shape defining a tubular conduit.

The porous metal material can be selected from any of the materials known to those skilled in the art including, but not limited to, the stainless steels, such as, for example, the 301, 304, 305, 316, 317, and 321 series of stainless steels, the HASTELLOY® alloys, for example, HASTELLOY® B-2, C-4, C-22, C-276, G-30, X and others, and the INCONEL® alloys, for example, INCONEL® alloy 600, 625, 690, and 718. The porous metal material, thus, can comprise an alloy that is hydrogen permeable and which comprises iron and chromium. The porous metal material may further comprise an additional alloy metal selected from the group consisting of nickel, manganese, molybdenum and any combination thereof.

One particularly desirable alloy suitable for use as the porous metal material can comprise nickel in an amount in the range of upwardly to about 70 weight percent of the total weight of the alloy and chromium in an amount in the range of from 10 to 35 weight percent of the total weight of the alloy. Another suitable alloy for use as the porous metal material comprises nickel in the range of from 30 to 70 weight percent, chromium in the range of from 12 to 35 weight percent, and molybdenum in the range of from 5 to 30 weight percent, with these weight percents being based on the total weight of the alloy. The Inconel alloys are preferred over other alloys.

The thickness (e.g. wall thickness or sheet thickness as described above), porosity, and pore size distribution of the pores of the porous metal substrate are properties of the porous substrate selected in order to provide a gas separation membrane of the invention that has the desired properties and as is required in the manufacture of the gas separation membrane of the invention. It is understood that, as the thickness of the porous substrate increases, when it is used in hydrogen separation applications, the hydrogen flux will tend to decrease. The operating conditions, such as pressure, temperature and fluid stream composition, may also impact the hydrogen flux. But, in any event, it is desirable to use a porous substrate having a reasonably small thickness so as to provide for a high gas flux therethrough. The thickness of the porous substrate for the typical application contemplated hereunder can be in the range of from about 0.1 millimeters (mm) to about 25 mm, but, preferably, the thickness is in the range of from 1 mm to 15 mm, more preferably, from 2 mm to 12.5 mm, and, most preferably, from 3 mm to 10 mm.

The porosity of the porous metal substrate can be in the range of from 0.01 to 1.0. The term porosity is defined herein as the proportion of non-solid volume to the total volume (i.e. non-solid and solid) of the porous metal substrate material. A more typical porosity is in the range of from 0.05 to 0.8, and, even, from 0.1 to 0.6.

The pore size distribution of the pores of the porous metal substrate can vary with the median pore diameter of the pores of the porous metal substrate material typically being in the range of from about 0.1 µm to about 50 µm. More typically, the median pore diameter of the pores of the porous metal substrate material is in the range of from 0.1 µm to 25 µm, and, most typically, from 0.1 µm to 15 µm.

It is a particularly important aspect of the invention that a noble metal eggshell catalyst is used as the layer, or intermediate layer, between the porous substrate and the overlayer of gas-selective material of the gas separation membrane. The term "noble metal eggshell catalyst," as it is used herein, means a particle, comprising an inorganic oxide material, which is coated with a metallic layer of a metal that is principally contained upon the outer surface of the inorganic oxide particle but which is not distributed throughout the inorganic oxide particle. The metal of the metallic layer (metal coating) may be selected from the group of noble metals, which can include any of several metallic chemical elements that have outstanding resistance to oxidation, even at high temperatures. This group may include the elements of rhenium, ruthenium, rhodium, palladium, silver, osmium, iridium, platinum, and gold (i.e., the metals of groups VIIA, VIII, and IB of the second and third transition series of the Periodic Table of Elements).

The aforementioned use of the noble metal eggshell catalyst is particularly beneficial in that it reduces the amount of time and the amount of waste that is generated in the manufacture of the gas separation membrane of the invention. The use of the noble metal eggshell catalyst provides other benefits as well, such as, allowing for the efficient utilization of noble metal in the manufacture of the gas separation membrane of the invention.

In one embodiment of the invention, the noble metal eggshell catalyst is made by spray coating or spray drying small inorganic oxide particles with a noble metal or noble metal compound followed by the reduction of the spray coated inorganic oxide particles to yield noble metal coated inorganic oxide particles that are suitable for use in the manufacture of the inventive gas separation membrane.

The spray dried particles of the noble metal eggshell catalyst may be made by the spray drying or coating techniques described herein or by the methods as described in the journal article entitled "The Distribution of Active Ingredients in Supported Catalysts Prepared by Impregnation," published in *Catalyst Reviews Science and Engineering*, Volume 27, pages 207-340 (1985). This article is incorporated herein by reference.

The spray coating or spray drying may be done by spraying an aqueous solution of a salt of the particular metal, selected for forming the metallic layer onto the particle of inorganic oxide material, under spray drying conditions that cause the aqueous solution to quickly dry before it permeates throughout the particle, and, thus, resulting in only the outer surface of the particle being coated with the metal salt.

One means by which the spraying step may be conducted is under spray drying conditions whereby a slurry of particles of inorganic oxide material contained within an aqueous solution of the metal salt is atomized and sprayed into a vessel through which a hot drying gas, such as air, oxygen, nitrogen, or carbon dioxide, is passed. The spray drying conditions are such that the atomized slurry quickly dries thereby leaving the metal salt residue on the outer surface of the particles. The hot drying gas can have a drying temperature in the range of from 50° C. (122° F.) to 500° C. (932° F.), and the spray drying vessel can be operated at a drying pressure in the range of from 1 atm to 10 atm.

The spray coated inorganic oxide particles are subsequently treated by any suitable method known to those skilled in the art for reducing the metal of the metal salt to its elemental form to thereby provide the metal-coated inorganic oxide particle of the invention. One preferred method is to treat the spray coated inorganic oxide particles with hydrogen under hydrogen treatment conditions such that the metal is reduced to its elemental form. This treatment may include contacting the spray coated inorganic oxide particles with a hydrogen atmosphere at a hydrogen treatment temperature in the range of from 50° C. (122° F.) to 500° C. (932° F.) and a hydrogen treatment pressure in range of from 1 atm to 10 atm to thereby reduce the metal of the spray coated inorganic oxide particles to the elemental form and provide the metal-coated inorganic oxide particle.

While it is preferred not to use a wet reduction of the metal, if the wet reduction can be utilized in a manner so that the metal-coated inorganic oxide particle will have the physical properties as described herein, a wet reduction method may be an option for use in the reduction of the metal. However, one of the advantages, among several, of the use of the spray coated inorganic oxide particles is that they may easily undergo a hydrogen treatment so as to reduce its metal coating to the metallic or elemental form, and, thus, eliminate the need for a wet reduction of the metal.

Potential wet reducing agents include sodium formate, formic acid, hydrazine, alkali metal borohydride, formaldehyde, ascorbic acid, and dextrose.

A particularly beneficial feature of the noble metal eggshell catalyst of the invention is that, due to the manner by which it is prepared or made, its metallic layer has a material absence of undesired metal components that may materially affect the properties of the noble metal eggshell catalyst or of the gas separation membrane that is made using such noble metal eggshell catalyst.

The preferred coating metal for the metallic layer of the inorganic oxide particle is a metal selected from the group of metals consisting of platinum, palladium, gold, silver and combinations thereof, and, thus, the metallic layer comprises a metal selected from the group of metals consisting of platinum, palladium, gold, silver and combinations thereof, and, further, the metallic layer may have a material absence of other metal components, such as iron or tin, that may have an undesirable affect upon the performance of the gas separation membrane. Thus, the metallic layer may also consist essentially of a metal selected from the group of metals consisting of platinum, palladium, gold, silver and combinations thereof. Among these metals, preferred are palladium, silver, gold and combinations of palladium and silver or gold.

The use of the aqueous solution of a salt of the metal to coat the inorganic oxide particle of the metal-coated inorganic oxide particle allows for the surface coating, as opposed to impregnation throughout, of the inorganic oxide particle and for the control of the amount of non-desired metal components contained in the metallic layer of the metal-coated inorganic oxide particle. Also, the use of hydrogen treatment of the spray coated inorganic oxide particles provides for the reduction of the metal therein to its elemental form, or an alloy if more than one metal is applied, and for the formation of a metallic layer having a higher purity than if other reduction methods are used.

An example of an undesirable wet reduction method is disclosed in US 2006/0016332, which teaches the use of stannous chloride to reduce palladium used in the activation of a powder to make a preactivated powder. This method is not a desirable method of metal reduction for the invention herein due to it tending to leave at least trace amounts of the non-desired tin within the metallic layer of the metal-coated inorganic oxide particle. The metallic layer preferably contains a material absence of tin, and, more preferably, a substantial absence of tin. The presence of the tin in the metallic coating can lead to problems associated with the adhesion of the gas-selective material overlayer to the surface of the porous substrate.

The aqueous solution used to coat the inorganic oxide particle is, in general, a water-soluble metal salt dissolved in water. Metal salts of palladium, platinum, gold, rhodium, rhenium, ruthenium, iridium, niobium and silver can be used. The aqueous solution may include one or more metal salts, so that, for example, the aqueous solution may include, among the possible metal salts, only a palladium salt dissolved in water, or it may include both a palladium salt and a silver salt dissolved in water. Examples of possible suitable palladium salts include palladium nitrate, palladium chloride, palladium acetate, and palladium amine complexes. Possible platinum salts include platinum chloride, platinum acetate, and platinum amine complexes. Possible silver salts include silver nitrate, silver acetate, and silver perchlorate.

The inorganic oxide particle of the metal-coated inorganic oxide particle is preferably a small particle comprising an inorganic oxide material. Examples of possible suitable inorganic oxide materials include, but are not limited to, alumina, silica, zirconia, titania, ceria, and aluminosilicates. The preferred inorganic oxide material of the inorganic oxide particle is selected from the group consisting of alumina, zirconia, silica, aluminosilicate and combinations thereof. The most preferred inorganic oxide material is alumina.

The inorganic oxide particles of the invention are to have particle sizes such that they, or at least a portion of the particles, can fit, at least partially, within certain of the pores of the porous metal substrate material, and, thus, they generally should have a maximum dimension of less than about 50 micrometers ($\mu m$). The particle size (i.e., the maximum dimension of the particle) of the inorganic oxide particle will also, generally, depend on the pore size distribution of the pores of the porous substrate utilized in the preparation of the gas separation membrane of the invention, and, typically, the median particle size is in the range of from 0.01 $\mu m$ to 50 $\mu m$. More specifically, the median particle size will be in the range of from 0.1 $\mu m$ to 15 $\mu m$. It is preferred for the median particle size of the inorganic oxide particles to be in the range of from 0.2 $\mu m$ to 3 $\mu m$.

It is further an important feature of the invention for the amount of metal coated onto the inorganic oxide particle and that is within the metallic layer to be a small amount relative to the total weight of the metal-coated inorganic oxide particle. Generally, the metal of the metallic layer is an amount that is less than 5 weight percent of the total weight of the metal-coated inorganic oxide particle. Thus, the metal content of the metal-coated inorganic oxide particle is an amount in the range of from 0.01 to 5 weight percent of the total weight of the metal-coated inorganic oxide particle. Preferably, the metal content of the metal-coated inorganic oxide particle is an amount in the range of from 0.01 to 2 weight percent, and, most preferably, from 0.01 to 0.1 weight percent.

As discussed in detail elsewhere herein, it is an important aspect of the invention for the inorganic oxide particles to have a metallic layer coated on their outer surface without the metal permeating throughout the remaining parts of inorganic oxide particle. Thus, in general, the metallic layer will have a depth or thickness within the metal-coated inorganic oxide particle in the range of from 0.01 to 2.5 µm, preferably, from 0.05 to 2 µm, and, most preferably, from 0.1 µm to 1 µm. The depth of the metallic layer coated on the outer surface of the inorganic oxide particles to thereby provide the noble metal eggshell catalyst will vary depending upon the size of the inorganic oxide particle. For example, an inorganic oxide particle having a size of approximately 50 µm will typically have a metallic layer coating thickness in the range of from about 0.5 µm to about 2.5 µm while an inorganic oxide particle having a size of approximately 1 µm will typically have a metallic layer coating thickness in the range of from about 0.1 µm to 0.2 µm. Thus, the thickness of the metallic layer coating can be in the range upwardly to about 20 percent (%) of the size of the inorganic oxide particle, more specifically, in the range of from 0.1 percent to 18 percent of the particle size, and, most specifically, from 0.2% to 15%.

In the manufacture of the gas separation membrane of the invention, a layer of the noble metal eggshell catalyst is applied or deposited upon the surface of the porous substrate by any suitable method known to those skilled in the art for applying a powder to a porous surface to provide a surface treated porous substrate. For instance, the metal-coated inorganic oxide particles may be applied to the surface of the porous substrate by transport with a gas, or by application of a slurry or suspension of the metal-coated inorganic oxide particles, or by pressing or rubbing of a powder of the metal-coated inorganic oxide particles upon the surface of the porous substrate.

The amount of metal-coated inorganic oxide particles that is applied to the surface of the porous substrate should be such as to cover its pores and, thus, it will provide a layer of the metal-coated inorganic oxide particles having a layer thickness greater than 0.01 µm, and, generally, in the range of from 0.01 µm to 25 µm, but, it is preferred for the layer thickness to be in the range of from 0.1 µm to 20 µm, and, most preferably, from 2 µm to 3 µm.

It is recognized that there is a wide variety of porous metal materials that have a wide range of pore structure characteristics, including, for instance, having pores of relatively large pore size, available for use as the porous substrate. For instances when the pores of the porous metal material have pores of relatively large pore size, it can be beneficial to deposit upon the surface of the porous substrate an initial layer of inorganic oxide particles that are not metal-coated (uncoated inorganic oxide particles) prior to applying the layer of metal-coated inorganic oxide particles on top of this initial layer of uncoated inorganic oxide particles and the surface of the porous substrate. This initial layer of uncoated inorganic oxide particles provides the benefit of covering at least a portion of the larger pores of the porous metal substrate so that the smaller particles do not fill the larger pores and significantly reduce the flux of the porous support.

Once the layer of metal-coated inorganic oxide particles is applied to the surface of the porous substrate to thereby provide a surface treated porous substrate, the surface treated porous substrate is then coated with an overlayer of a gas-selective material to thereby provide a coated, surface-treated porous substrate having gas separation properties.

A gas-selective material, as the term is used herein, is a material that is selectively permeable to a gas, and, thus, an overlayer of such a material will function so as to selectively allow the passage of a selected gas therethrough while preventing passage of other gases. Possible gas-selective metals include palladium, platinum, gold, silver, rhodium, rhenium, ruthenium, iridium, niobium, and alloys of two or more thereof. In a preferred embodiment of the invention, the gas-selective material is a hydrogen-selective metal such as platinum, palladium, gold, silver and combinations thereof, including alloys. The preferred gas-selective material is palladium, silver and alloys of palladium and silver.

The gas-selective material is deposited onto the surface-treated porous substrate by any suitable means or method known to those skilled in the art. Possible deposition methods include electroless plating, thermal deposition, chemical vapor deposition, electroplating, spray deposition, sputter coating, e-beam evaporation, ion beam evaporation and spray pyrolysis. A preferred deposition method is electroless plating. An example of a suitable electroless plating method for deposition of the gas-selective material onto the surface-treated porous substrate is that which is disclosed in Pub. No. US 2006/0016332, the disclosure of which is incorporated herein by reference.

It is desirable for the thickness of the overlayer coating of gas-selective material to be as small as is feasible so as to provide for large gas fluxes while still providing for the function of selectively allowing the passage of certain gas molecules but preventing the passage of others. Typically, the overlayer thickness is less than 50 µm, but, preferably, the overlayer thickness is less than 20 µm, and, more preferably, less than 10 µm, and, most preferably, less than 8 µm. The typical lower limit to the overlayer thickness is greater than 1 µm, and, thus, the overlayer thickness may be in the range of from 1 µm to 50 µm, or from 1 µm to 20 µm. The preferred range for the overlayer thickness is from 1 µm to 10 µm, and, most preferred, from 1 µm to 8 µm.

The inventive gas separation membrane may be used in the selective separation of a select gas from a gas mixture. The gas separation membrane is particularly useful in the separation of hydrogen from a hydrogen-containing gas stream, especially, in high temperature applications. One example of a high temperature application in which the inventive gas separation membrane can be used is in the steam reforming of a hydrocarbon, such as methane, to yield carbon monoxide and hydrogen, followed by the reaction of the yielded carbon monoxide with water in a so-called water-gas shift reaction to yield carbon dioxide and hydrogen. These catalytic reactions are equilibrium type reactions, and the inventive gas separation membrane can be useful in the simultaneous separation of the yielded hydrogen while conducting the reactions in order to enhance the equilibrium conditions to favor hydrogen yield. The reaction conditions under which the reactions are simultaneously conducted can include a reaction temperature in the range of from 400° C. to 600° C. and a reaction pressure in the range of from 1 to 30 bars.

As already noted, the inventive gas separation membrane can be used in a wide variety of applications that involve the separation of hydrogen from gas streams that comprise other gases, for example, those selected from the group of gases consisting of carbon dioxide, water, methane or mixtures thereof. In such applications, the temperature conditions can be in the range upwardly to 600° C., for instance, in the range of from 100° C. to 600° C., and the pressure conditions can be in the range upwardly to 50 bar, for instance, in the range of from 1 to 40 bar.

The FIG.s are provided to help illustrate certain aspects of the invention, and, in reference to FIG. 1, presented is a depiction of a cross-section of the noble metal eggshell catalyst 10 of the invention. While the noble metal eggshell catalyst 10 is shown as being spherical in shape, it is understood that it is not required to have any particular shape. The particle may be irregularly shaped or regularly shaped. What is important, however, is that the particle be small in size having the dimensions as are discussed in detail elsewhere herein and that it has a metallic layer or coating principally on its outer surface, as opposed to the metal being distributed throughout the inorganic particle 12. The noble metal eggshell catalyst 10, thus, comprises an inorganic oxide particle 12 that is coated with a metallic layer 14. The metallic layer 14 penetrates the particle 12 to thereby provide a metallic layer thickness having the dimensions as are discussed in detail elsewhere herein.

Presented in FIG. 2 is a block diagram illustrating the steps used in one manufacturing method 200 by which the metal-coated inorganic oxide particle 10 of FIG. 1 may be manufactured.

In manufacturing method 200, a slurry of small inorganic oxide particles contained within an aqueous metal solution is introduced into vessel 202 by way of line 204. The slurry is atomized and formed into an atomized spray stream 208 that is sprayed into vessel 202. Spray drying conditions are maintained within the vessel 202 by introducing a hot drying gas into the vessel 202 by way of line 210 and passing the hot drying gas through the vessel 202 so as to provide for the rapid drying of the slurry of aqueous metal solution and inorganic oxide particles.

The hot drying gas effluent passes from the vessel 202 by way of line 212. The rapid drying of the inorganic oxide particles results in spray coated inorganic oxide particles having upon their surfaces a metal salt residue without the metal salt penetrating throughout the inorganic oxide particles.

The spray coated inorganic oxide particles are then subjected to a reduction step so as to reduce the metal salt that is coated thereon to the elemental form. Any type of reduction method known to those skilled in the art may be used to reduce the metal, but whatever method is used, it is important that the amount of contaminating compounds or material that remain in the finally prepared metal-coated inorganic oxide particles be minimized. Thus, while a wet reduction may suitably be used in this invention, it is preferred to use a hydrogen treatment in conducting the reduction of the metal salt in the spray coated inorganic oxide particles.

The spray coated inorganic oxide particles are then provided to a vessel 214 by way of line 216. Within the vessel 214 the spray coated inorganic oxide particles are exposed to a hydrogen atmosphere under temperature and pressure conditions that provide for the reduction of the metal salt of the spray coated inorganic oxide particles to the elemental form of the metal. Hydrogen gas is introduced into vessel 214 by way of line 218. The off-gas passes from vessel 214 by way of line 220, and the metal-coated inorganic oxide particles pass from vessel 214 by way of line 222.

Presented in FIG. 3 is a depiction of a cross-section of a portion of a gas separation membrane 300 of the invention that includes a porous substrate 302 of a porous metal material over which is a layer 304 of noble metal eggshell catalyst. This layer 304 is coated with an overlayer 306 of a gas-selective material. The porous substrate 302 has an undersurface 308 and a top surface 310, which, together, define a sheet thickness 312. While the gas separation membrane 300 is depicted as being planar, it should be recognized that it may also be curvilinear or tubular in shape.

The layer 304 of noble metal eggshell catalyst is applied to the surface 310 of the porous substrate 302 in such suitable amounts as to provide a layer thickness 314 of the noble metal eggshell catalyst to thereby provide the surface treated porous substrate. The layer 304 of the surface treated porous substrate is then coated with the overlayer 306 of gas-selective material in such an amount as to provide a coated, surface-treated porous substrate, wherein the overlayer 306 has an overlayer thickness 316, and thereby providing the gas separation membrane 300.

Reference is now made to FIG. 4, which depicts a cross-section of a tubular gas separation membrane system 400 of the invention used in a process for the selective separation of a gas component from a gas mixture. The tubular gas separation membrane system 400 includes a porous substrate 402 having an inside surface 404 and an outside surface 408 that define a conduit 410. A layer 412 of noble metal eggshell catalyst covers the outside surface 408 of the porous substrate 402. The layer 412 of noble metal eggshell catalyst is coated with an overlayer 414 of gas-selective material.

One method of using the tubular gas separation membrane system 400 can be for the selective separation of hydrogen gas from a gas mixture, comprising hydrogen gas. In this method, the gas mixture 416 is introduced into the inlet end 418 of conduit 410 and is passed through the conduit 410 from which an effluent gas 420 is removed from the outlet end 422 of the conduit 410. As the gas mixture passes through conduit 410, the hydrogen gas contained in the gas mixture selectively passes through and across the gas separation membrane to the outside zone 424 that is outside of the overlayer 414.

The relative pressure conditions within the conduit 410 and outside zone 424 are such as to promote the direction of the hydrogen flux to be from within the conduit 410 to the outside zone 424 of the overlayer 414. Therefore, the partial pressure of the hydrogen gas within the conduit 410 is below the partial pressure of the hydrogen gas that is in the outside zone 424 outside of the overlayer 414 of the gas separation membrane system 400.

The following examples are provided to further illustrate the invention, but they are not to be construed as limiting the scope of the invention.

EXAMPLE I

This Example I describes how metal-coated inorganic oxide particles (in this Example I, 0.1 wt. % palladium on alumina eggshell catalyst) that suitably can be used in treating the surface of a porous substrate in the manufacture of the inventive gas separation membrane may be prepared.

A slurry of alpha alumina powder in an aqueous solution of a palladium salt was prepared by mixing 2,500 grams of distilled water, 500 grams alpha alumina powder (Sumitomo AKP 15 alumina powder), and 1.08 grams of an aqueous solution of palladium nitrate ($Pd(NO_3)_2$) in water having a solution concentration of 10.01 wt. % Pd. While stirring the slurry in order to keep the alumina powder from settling, the slurry was spray dried using a NIRO Minor Hi-Tec spray drier.

The spray drying conditions included introducing hot air into the spray dryer at a temperature of about 350° C. and a rate of between 5.8 to 6 kg air/hr at a nozzle pressure of 1.5 bar. The slurry was introduced into the spray dryer at an approximate rate of 1.5 kg slurry/hr. The outlet temperature of the spray drier was about 100° C. The spray drier nozzle type was a two-fluid, 1.5 mm tip, fountain set-up.

The spray-dried powder was calcined in a muffle kiln at 450° C. for three hours and thereafter hydrogen reduced at a temperature of 200° C. for two hours in a glass reactor.

EXAMPLE II

This Example II describes the preparation of alloyed palladium-silver metal-coated inorganic oxide particles (i.e., 1.23 wt % alloyed palladium-silver on alpha alumina eggshell catalyst) used in treating the surface of a porous substrate in the manufacture, as described in Example III, of the inventive gas separation membrane.

To a slurry of 500 grams alpha alumina powder in an 2500 grams of distilled water was added an 108.27 grams of a 10 wt. % solution of palladium nitrate and 18.11 grams a 10 wt. % solution of silver nitrate while stirring in order to keep the alumina powder from settling. The slurry was spray dried using a NIRO Minor Hi-Tec spray drier.

The spray drying conditions included introducing hot air into the spray dryer at an inlet temperature of 350° C. and a rate between 5.8 to 6 kg air/hr at a nozzle pressure of 1.5 bar. The slurry was introduced into the spray dryer at an approximate rate of 1.5 kg slurry/hr. The outlet temperature of the spray drier was about 100° C. The spray drier nozzle type was a two-fluid, 1.5 mm tip, fountain set-up.

The spray-dried powder was calcined in a muffle kiln at 450° C. for three hours and thereafter hydrogen reduced at a temperature of 200° C. for two hours in a glass reactor.

EXAMPLE III

This Example III describes the manufacture of a composite gas separation module or membrane system that utilizes the noble metal eggshell catalyst as described in Example II and is overlaid with a palladium coating by use of electroless plating.

A composite gas separation module was prepared using a 1-inch OD×6-inch length duplex porous Inconel support that was supplied by Mott Corporation. The support was degreased thoroughly and extensively tested to ensure suitability for use in the experiment.

A slurry of the 1.23 wt % alloyed palladium-silver on alpha alumina eggshell catalyst, as described in Example II, in deionized water was applied to the surface of the Inconel support by means of vacuum filtration to form a layer of the eggshell catalyst thereon and to thereby provide a support that has been surface treated. The surface treated support was then coated with an overlayer of palladium by electrolessly plating the surface treated support with palladium, without the use of any activation methods, in a plating bath containing 450 mL of palladium plating solution and 1.8 mL of 1M hydrazine hydrate solution. The palladium plating solution included 198 ml of 30% ammonium hydroxide solution, 4 grams tetraaminepalladium (II) chloride, 40.1 grams ethylenediaminetetraacetic acid disodium salt, and 1 liter deionized water.

During the plating, a slight vacuum of 5-6 inches of Hg was maintained on the interior of the support for 5 minutes, after which the vacuum source was turned off and the vacuum decayed to zero over the course of 3-4 minutes. The module was then thoroughly washed with 60° C. deionized water, and then dried at 140° C. for 8 hours.

The module was then plated for 90 minutes, without vacuum or activation, in 450 mL of the palladium plating solution and 1.8 mL of 1M hydrazine hydrate solution. The module was then thoroughly washed with hot deionized water to remove any residue salts and then dried at 140° C. for 8 hours.

The module was completed by plating in two palladium plating baths containing 450 mL of palladium plating solution and 1.8 mL of 1M hydrazine hydrate solution, while under a vacuum of 28-30 inches Hg applied to the tube side of the support. The module was then thoroughly washed with hot deionized water to remove residual salts and then dried at 140° C. for 8 hours.

The resulting dense, gas-selective, composite hydrogen gas separation module of palladium on an Inconel support had a gas dense layer thickness of 5.08 microns. Testing of the module displayed a hydrogen permeance of 72.6 $m^3/(m^2)(hr)$ (bar).

EXAMPLE IV

This Example IV describes the manufacture of a composite gas separation module or membrane system that utilizes the noble metal-eggshell catalyst as described in Example II in forming a layer upon a surface over which layer is placed an overlayer of a coating of palladium-silver alloyed metal powder.

A composite gas separation module was prepared on a 1 inch OD×6-inch length 18-15-MF-20 porous support that was supplied by Mott Corporation. This gas separation module is a porous substrate treated with a layer of palladium-silver coated alpha alumina eggshell catalyst, which is thereafter coated with palladium-silver alloyed metal powder to give the composite gas separation module.

The support was degreased thoroughly and extensively tested to ensure suitability for use in the experiment. No oxidation was performed. A layer of alpha alumina was applied initially to the support by vacuum deposition.

A slurry of 1.23% alloyed palladium-silver on alpha alumina eggshell catalyst, as described above, in deionized water above was applied to the support by means of vacuum filtration. The support treated with the layer of eggshell catalyst was then electrolessly plated with palladium without the prior use of any activation methods, in a plating bath containing 450 mL of palladium plating solution (described in the above Example) and 1.8 mL of 1M hydrazine hydrate solution. During the plating, a slight vacuum of 10-15 inches of Hg was maintained on the interior of the support for 15 minutes. Directly after the initial palladium plating, a slurry of palladium-silver alloyed metal powder in deionized water was applied to the support by means of vacuum filtration at 20-25 inches of Hg. The module was then thoroughly washed with 60° C. deionized water, and then dried at 140° C. for 8 hours.

The module was then plated using 8×90 min palladium platings with the vacuum increasing from 0-28 inches of Hg. The module was then thoroughly washed with 60° C. deionized water and then dried at 140° C. for 8 hours.

The resulting dense, gas selective, hydrogen gas composite separation module of palladium on an 18-15-MF-20 support had a gas dense layer thickness of 18.81 microns.

That which is claimed is:

1. A method of making a gas separation membrane, wherein said method comprises:
    preparing a noble metal eggshell catalyst by spray coating or spray drying an inorganic oxide particle having a median particle size in the range of from 0.01 to 50 μm with a noble metal or noble metal compound thereby producing a metallic layer on the outer surface of said inorganic oxide particle, said metallic layer having a layer thickness in the range of from 0.01 to 2.5 μm applying to a surface of a porous substrate a layer of said noble metal eggshell catalyst to thereby provide a surface treated porous substrate; and coating said surface-treated porous substrate with an overlayer of a gas-selective material to thereby provide a coated, surface-treated porous substrate suitable for use as said gas separation membrane.

2. A method as recited in claim 1, wherein said metallic layer comprises a metal selected from the group of metals consisting of platinum, palladium, gold, silver, rhodium, iridium, ruthenium, niobium and combinations of two or more thereof, and wherein said noble metal eggshell catalyst further includes said metal in an amount in the range of less than 5 weight percent of the total weight of said noble metal eggshell catalyst.

3. A method as recited in claim 2, wherein said noble metal eggshell catalyst is made by the method comprising:

drying, under spray drying conditions, a slurry of said inorganic oxide particles contained in an aqueous solution of said metal to thereby provide a spray coated inorganic oxide particle; and treating said spray coated inorganic oxide particle with hydrogen under hydrogen treatment conditions such that said metal is reduced to its elemental form and to thereby provide said noble metal eggshell catalyst.

4. A method as recited in claim 3, wherein said metal of said metallic layer is selected from the group consisting of platinum, palladium, gold, silver and combinations thereof.

5. A method as recited in claim 3, wherein said metal of said metallic layer includes an alloy of palladium and silver.

6. A method as recited in claim 3, wherein said metal of said metallic layer includes palladium.

7. A method as recited in claim 3, wherein said metal of said metallic layer is present in an amount in the range of 0.01 to 2 weight percent of the total weight of said noble metal eggshell catalyst.

8. A method as recited in claim 3, wherein said layer of noble metal eggshell catalyst has a material absence of a binder material.

9. A method as recited in claim 3, wherein said metallic layer has a metallic layer thickness in the range of from 0.05 µm to 2 µm.

10. A method as recited in claim 9, wherein said metallic layer has a layer thickness in the range of from 0.1 µm to 1 µm.

11. A method as recited in claim 10, wherein said overlayer of said gas-selective material has an overlayer thickness of less than 25 µm.

12. A gas separation membrane, comprising:

a porous substrate treated with a layer of a noble metal eggshell catalyst, said noble metal eggshell catalyst comprising an inorganic oxide particle having a median particle size in the range of from 0.01 to 50 µm coated on the outer surface by spray coating or spray drying with a metallic layer of noble metal or noble metal compound, said metallic layer having a layer thickness in the range of from 0.01 to 2.5 µm, with said layer of noble metal eggshell catalyst being coated with an overlayer of a gas-selective material.

13. A gas separation membrane as recited in claim 12, wherein said metallic layer comprises a metal selected from the group consisting of platinum, palladium, gold, silver and combinations of two or more thereof, and wherein said noble metal eggshell catalyst includes said metal in an amount in the range of less than 5 weight percent of the total weight of said noble metal eggshell catalyst.

14. A process for separating hydrogen from a hydrogen-containing gas stream, wherein said process comprises:

passing said hydrogen-containing gas stream over a gas separation membrane, comprising a porous substrate treated with a layer of a noble metal eggshell catalyst, said noble metal eggshell catalyst comprising an inorganic oxide particle having a median particle size in the range of from 0.01 to 50 µm coated on the outer surface by spray coating or spray drying with a metallic layer of noble metal or noble metal compound, said metallic layer having a layer thickness in the range of from 0.01 to 2.5 µm, with said layer of noble metal eggshell catalyst being coated with an overlayer of a gas-selective material, under temperature and pressure conditions such that hydrogen from said hydrogen-containing gas stream selectively passes through said gas separation membrane.

15. A process as recited in claim 14, wherein said metallic layer comprises a metal selected from the group consisting of platinum, palladium, gold, silver, rhodium, iridium, ruthenium, and combinations of two or more thereof, wherein said noble metal eggshell catalyst includes said metal in an amount in the range of less than 5 weight percent of the total weight of said noble metal eggshell catalyst.

16. A method as recited in claim 3, wherein said porous substrate is a metal porous substrate having a median pore diameter in the range 0.1 to 25 µm.

17. A method as recited in claim 16, wherein said metal porous substrate is an alloy that is hydrogen permeable and which comprises iron and chromium.

18. A method as recited in claim 3, wherein said inorganic oxide particle is alpha alumina.

19. A gas separation membrane as recited in claim 12, wherein said inorganic oxide particle has a median particle size in the range of from 0.1 to 15 µm.

20. A gas separation membrane as recited in claim 19, wherein said porous substrate is a metal porous substrate having a median pore diameter in the range 0.1 to 25 µm.

21. A gas separation membrane as recited in claim 19, wherein metallic layer of noble metal is coated on the outer surface of the inorganic oxide particle by spray drying, and the resulting spray coated inorganic oxide particle is treated with hydrogen under hydrogen treatment conditions such that said metal is reduced to its elemental form.

22. A gas separation membrane as recited in claim 19, wherein said eggshell catalyst used to treat the porous substrate comprises palladium on alpha alumina.

23. A gas separation membrane as recited in claim 19, wherein said eggshell catalyst used to treat the porous substrate comprises alloyed palladium-silver on alpha alumina.

* * * * *